W. S. MILLER.
AUTOMOBILE WHEEL.
APPLICATION FILED JUNE 24, 1915.
1,154,876.
Patented Sept. 28, 1915.
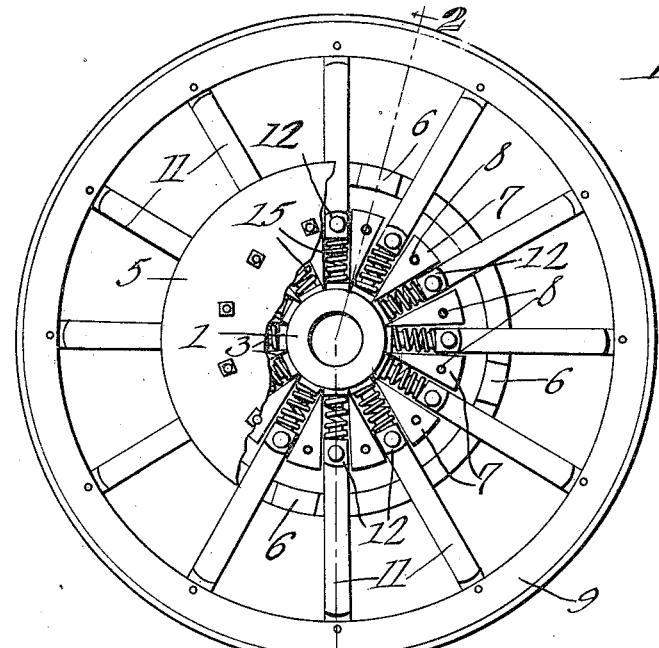
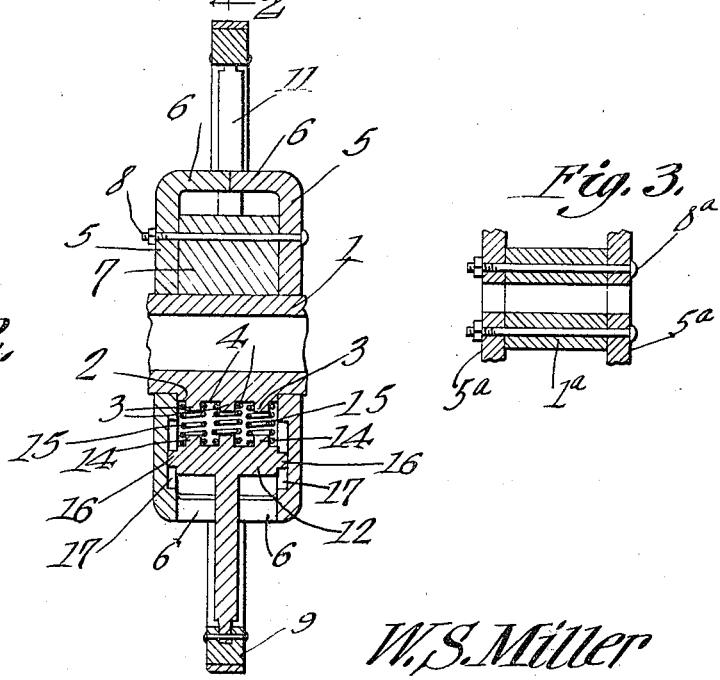
Witnesses
W. S. Miller
Inventor

BEST AVAILABLE COPY

UNITED STATES PATENT OFFICE.

WILLOUGHBY S. MILLER, OF READING, PENNSYLVANIA.

AUTOMOBILE-WHEEL.

1,154,876.  Specification of Letters Patent.  Patented Sept. 28, 1915.

Application filed June 24, 1915. Serial No. 36,126.

*To all whom it may concern:*

Be it known that I, WILLOUGHBY S. MILLER, a citizen of the United States, residing at Reading, in the county of Berks and State of Pennsylvania, have invented a new and useful Automobile-Wheel, of which the following is a specification.

The device forming the subject matter of this application is a spring wheel, and the invention aims particularly to improve the resilient hub portion of the wheel.

The invention aims to provide novel means for mounting and holding in place, operatively, the springs which coact with the hub of the wheel.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows the invention in side elevation, a part of one of the side plates being broken away; Fig. 2 is a cross section taken approximately on the line 2—2 of Fig. 1; Fig. 3 is a cross sectional detail showing a slight modification in the invention.

In carrying out the present invention there is provided a hub 1 equipped about its circumference with transverse ribs 2 having outwardly extended lugs 3, the spaces between the ribs 2 defining seats 4.

The invention comprises a pair of side plates 5 through which the hub 1 passes, the side plates 5 being equipped at spaced points about their circumferences with approaching, abutting lugs 6. Located between the side plates 5 are wedge-shaped guides 7. Securing elements 8 pass through the guides 7 to attach the same to the side plates 5.

The wheel herein disclosed comprises a rim 9 to which may be pivoted the outer ends of spokes 11, each spoke terminating at its inner end in a transverse head 12 located between a pair of the guides 6 each head 12 having lugs 14, and compression springs 15 being engaged with the lugs 14 of the heads 12 and the lugs 3 on the ribs 2. Although in the drawings but three springs are shown as operatively connected with each spoke, it is to be understood that the number of springs employed may be increased or decreased, as the nature of the load may demand. The heads 12 and the spokes 11 are equipped at their ends with reduced extensions 16 slidably mounted in radial guide openings 17 formed in the inner faces of the side plates 5, it being understood that the guide slots 17 may be fashioned in any desired manner in order that the structure may be operative and possess the desired resiliency. In this connection it is to be noted that the heads of the spokes 11 do not fit tightly between adjacent guides 7, the general construction being such that the hub may move downwardly with respect to the rim of the wheel, under a load.

The inner ends of the wedge-shaped guides 7 are received in the seats 4 defined by the ribs 2 on the hub 1, the guides being held in place by the securing elements 8 which are terminally mounted in the side plates 5.

If, as shown in Fig. 3, the hub 1ª is of sufficient diameter, the cover plates 5ª may be secured to the hub by means of bolts 8ª or other securing elements adapted to a like end.

Having thus described the invention, what is claimed is:—

1. In a spring wheel, a tubular hub; ribs extended lengthwise of the hub and spaced circumferentially of the hub to define seats; spring holding means on the ribs; side plates mounted on the hub; a rim; spokes entering between the plates and having their outer ends secured to the rim; springs engaged at their outer ends with the spokes and engaged at their inner ends with the spring holding means; securing elements uniting the plates between the spokes; and wedge-shaped guides mounted on the securing elements, the smaller ends of the guides being received in the seats, independently of the spring holding means, thereby to prevent a swinging of the guides on the securing elements and an engagement between the smaller ends of the guides and the springs.

2. In a device of the class described, a hub; guides surrounding the hub; side plates; securing elements connecting the side plates with the guides; a rim; spokes attached at their outer ends to the rim; the inner ends of the spokes being provided with transverse heads, the inner faces of the side plates being equipped with enlarged openings in which the ends of the heads are movably received; and springs interposed between the heads and the hub.

3. In a device of the class described, a hub; a rim; side plates assembled with the hub and provided in their inner faces with radial side openings; spokes provided with transverse heads having extensions slidably received in the guide slots, the ends of the heads bearing against the inner faces of the side plates beyond the guide slots; and springs interposed between the heads of the spokes and the hub.

In testimony that I claim the foregoing as my own, I have hereto affixd my signature in the presence of two witnesses.

WILLOUGHBY S. MILLER.

Witnesses:
  ROBERT C. MILLER,
  JOHN BOVELL.